(No Model.)
J. GRAY.
BRIDLE.
No. 426,797. Patented Apr. 29, 1890.
Fig. 1.
Fig. 2.
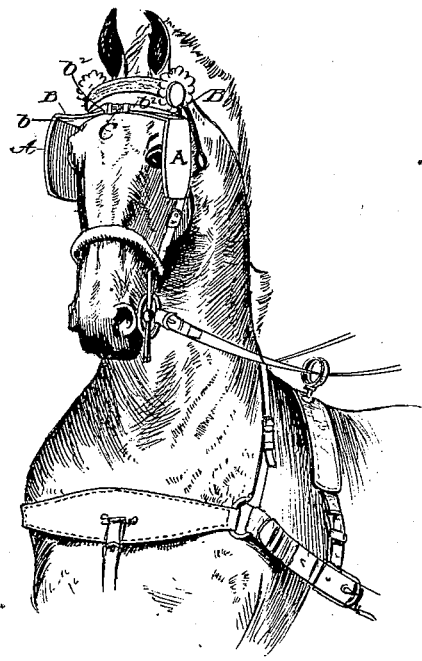
Fig. 3.
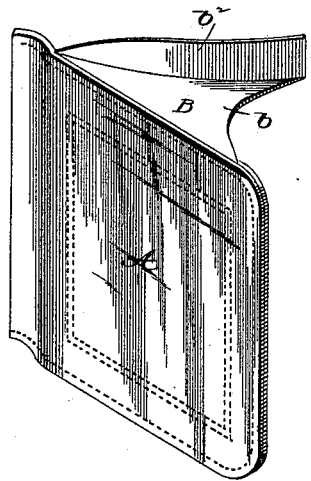
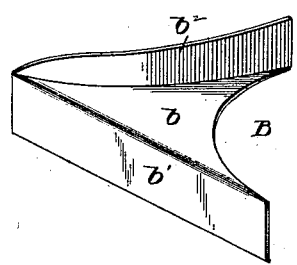
Fig. 4.
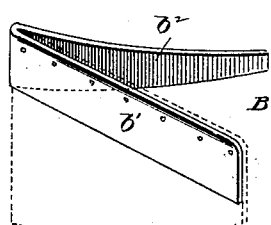
Witnesses:
W. W. Mortimer
F. Pauly Elmore
Inventor:
John Gray
By his Atty
Phil. T. Dodge
THE NORRIS PETERS CO., PHOTO-LITHO., WASHINGTON, D. C.

UNITED STATES PATENT OFFICE.

JOHN GRAY, OF JEFFERSON, IOWA.

BRIDLE.

SPECIFICATION forming part of Letters Patent No. 426,797, dated April 29, 1890.

Application filed November 29, 1889. Serial No. 331,851. (No model.)

*To all whom it may concern:*

Be it known that I, JOHN GRAY, of Jefferson, in the county of Greene and State of Iowa, have invented certain Improvements in Driving-Bridles, of which the following is a specification.

My invention has reference to the blinds or winkers used on driving-bridles; and the objects of the invention are, first, to hold the blind away from the eye of the horse at a suitable angle to the head to afford entire freedom of vision in a forward direction, and, secondly, to prevent the animal from looking rearward over the upper edge of the blind.

To this end the invention consists, first, in a brace or support adapted to be secured to the upper edge of the blind and to bear against the forehead of the animal; second, in a brace or stay constructed in such manner that it will close the angular space between the forehead of the animal and the upper edge of the blind.

In the accompanying drawings, Figure 1 is a perspective view of a bridle provided with my improvement as it appears when in use. Fig. 2 is a perspective view of a blind provided with my improvement in its preferred form. Fig. 3 is a perspective view of the brace or stay forming the subject of my invention. Fig. 4 is a perspective view of a stay or brace in modified form.

Referring to the drawings, A A represent ordinary blinds or winkers attached at their rear edges to the cheek-straps of a driving-bridle in the ordinary manner. The blinds are, as usual, of practically flat form and arranged to stand in vertical positions, so that angular spaces exist between their upper edges and the sides of the animal's head.

The entire bridle, including the blinds, may be of ordinary construction except as regards my brace or stay.

B represents the braces, which may be made in various equivalent forms to be sold in the market as an article of manufacture for application to ordinary blinds. The preferred form is that shown in Figs. 1, 2, and 3. As shown in these figures, the stay consists of a flat triangular piece $b$, adapted to fill the space between the upper edge of the blind and the head of the animal, one edge being provided with a depending lip or welt $b'$, adapted to be stitched into or otherwise secured to the top of the blind, while the other edge is provided with a raised flat portion $b^2$, adapted to bear against the animal's head, and thus hold the blind outward at the desired angle, in order that it may not vibrate or close over the eye. In this form the blind actually closes the space between the head and the blind, so that the animal is prevented from looking to the rear.

In the form shown in Fig. 4, the stay or brace consists, simply, of a strip of sheet metal or like material bent into V form, one end being adapted for attachment to the upper edge of the blind, (shown in dotted lines,) while the opposite end is arranged to bear against the side of the animal's head. The blind and the stay may be made of any suitable material and united in any appropriate manner.

The stays or braces prevent the blinds from swinging inward. In order to hold them in proper position and prevent them from swinging outward, I may use, if desired, a strap C or equivalent connections between them.

I am aware that a blind has been produced by bending a crescent-shaped piece of leather into suitable shape to partly encircle the eye of the animal, and this I do not claim.

What I claim is—

1. As an improved article of manufacture, the angular stay provided at one edge with a downturned flange for attachment to the blind, and at the opposite edge with a vertical flange adapted to bear against the horse's head.

2. In a bridle, the upright flat blind attached at its rear edge to the bridle, in combination, with the horizontal triangular brace secured at one edge to the top of the blind and arranged to bear at the opposite edge against the side of the animal's head.

In testimony whereof I hereunto set my hand, this 9th day of November, 1889, in the presence of two attesting witnesses.

JOHN GRAY.

Witnesses:
J. R. SMITH,
J. W. FITZ.